May 4, 1943. W. J. ROWAN 2,318,334
DEVICE FOR TRIMMING LAWNS
Filed Nov. 13, 1940
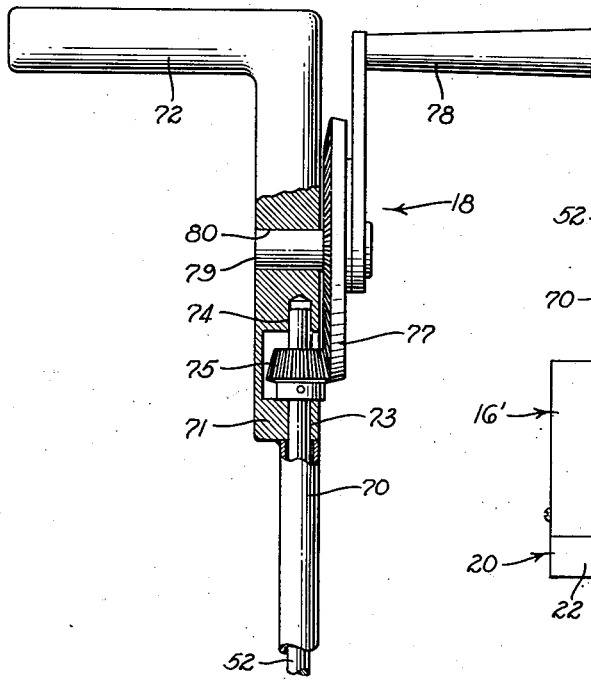
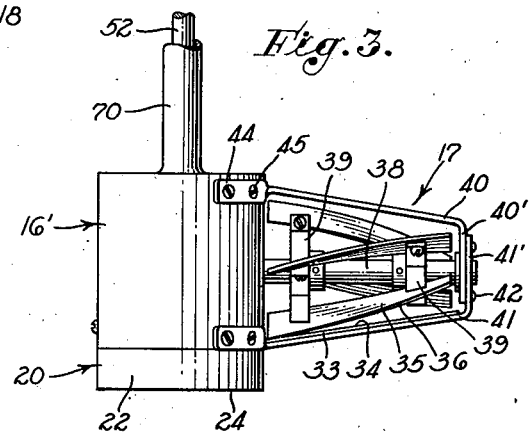
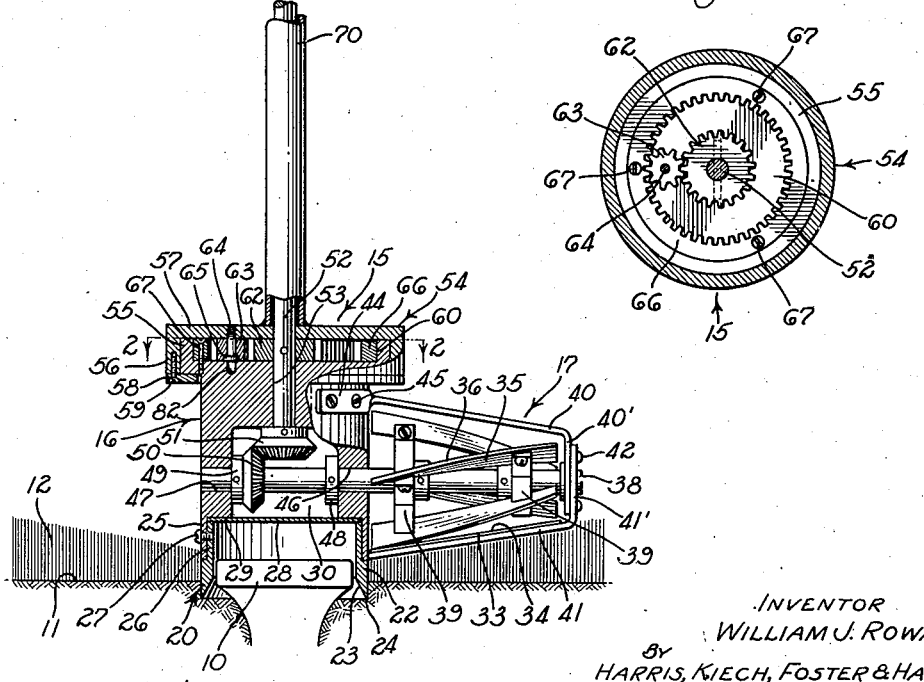
INVENTOR
WILLIAM J. ROWAN
BY
HARRIS, KIECH, FOSTER & HARRIS
Clarence F. Kiech
FOR THE FIRM
ATTORNEYS.

Patented May 4, 1943

2,318,334

UNITED STATES PATENT OFFICE 2,318,334

DEVICE FOR TRIMMING LAWNS

William J. Rowan, Los Angeles, Calif.

Application November 13, 1940, Serial No. 365,432

20 Claims. (Cl. 56—249)

My invention relates to a lawn-trimming device and, more particularly, to a device for trimming the grass in an annular zone around sprinkler heads, golf-green cups, etc. The invention will be particularly described with reference to a moving device adapted to facilitate cutting of grass around a sprinkler head, but it will be apparent that other uses are contemplated.

The usual lawn mower does not trim the grass accurately around a sprinkler head. Sometimes the sprinkler head is elevated so that the lawn mower cannot be safely run thereacross. More commonly, the sprinkler head is flush or slightly above the top of the ground so as to clear the blades of the lawn mower, but a conventional mowing operation does not properly trim the grass immediately adjacent the sprinkler head. This is particularly true with regard to lawns containing Bermuda grass or other growth having a spreading characteristic, and which tends to cover the top of the sprinkler head to interfere with the desired spray. It is conventional practice to hand-clip this grass from above the sprinkler head and, sometimes, the grass in an annular zone therearound.

It is an object of the present invention to provide a simple device for trimming lawns adjacent a sprinkler head and, more particularly, to provide such a device which can be centered with respect to the desired zone to be trimmed, and which provides a mowing means adapted for revolution around the central axis so as to trim the grass in an annular zone.

Another object of the invention is to provide an annular engagement or centering means which can be inserted in the ground or concentric with a device mounted in the ground, such as a sprinkler head or golf-green cup, and which serves both to establish a center around which the mowing unit can revolve and to cut or displace grass growing at a position adjacent or toward the inside of the engagement means.

Another object of the invention is to provide a mowing unit which can be moved in an annular path and which is operated at a point convenient to the operator.

Still another object of the invention is to provide a mowing unit of the general type described and which is driven by a crank positioned above the unit.

Yet another object of the invention is to provide a mowing device in which the turning of a single element, for example a crank, will both turn the blades of a mowing unit and revolve the mowing unit to mow the grass in an annular zone.

Another object of the invention is to provide a mowing unit including movable and stationary shearing means, such as movable and stationary blades, the shearing action preferably being along a line inclined with respect to the horizontal.

Another object of the invention is to provide such an inclined shearing means in combination with a mowing unit adapted for movement in an annular zone around a predetermined vertical axis so as to cut a swath of frusto-conical shape.

Further objects and advantages of the invention lie in the novel arrangement of elements, whether or not used to mow an annular zone around a sprinkler head, and will be evident from the exemplary embodiment shown in the accompanying drawing and described in detail hereinafter.

Referring particularly to the drawing:

Figure 1 is a side elevational view, partially in section, of the invention;

Figure 2 is a horizontal sectional view taken on the line 2—2 of Figure 1; and

Figure 3 is a fragmentary sectional view of an alternative embodiment of the invention.

By way of example, the invention has been shown in Figure 1 for use in clipping or mowing grass around a sprinkler head, indicated generally by the numeral 10, this head being shown as mounted slightly above the surface of the ground 11, from which grass 12 is growing.

The invention includes, generally, a mowing device 15 including a body 16 carrying a mowing unit 17 adapted to encircle the sprinkler head 10 to mow an annular zone of grass therearound. The mowing device 15 is adapted to be actuated by control mechanism, indicated generally by the numeral 18, and usually positioned about three feet above the mowing unit 17 to be convenient to the operator.

More specifically, the body 16 includes a centering or ground-engageable pivot means, shown as comprising an engagement means 20. This centering means acts in the nature of a pivot or anchor means and determines the center about which the mowing unit 17 is to be turned to mow a desired annular zone concentric with this center. The engagement means 20 is adapted for engagement with the ground or with some device mounted therein, for example the sprinkler head 10, the cup of a golf-green, etc., and the terms "ground-engageable" or "ground-anchoring" are herein used to cover any such modes of pivotal attachment. Such an engagement means may contact the ground or such other device at a single point or in an annular zone, as shown in Figure 1.

Preferably, the engagement means 20 provides an annular cutter 22 of tubular shape and of sufficient diameter to extend downward close to the periphery of the sprinkler head 10. Lowering this cutter 22 into the position shown in Figure 1 will tend to depress or cut any grass or weeds growing inward across the top of the sprinkler head. To facilitate the cutting action, the lower end of the cutter 22 is beveled, as indicated by the numeral 23, to provide a relatively sharp cutting edge 24.

It is preferable to make the engagement means 20 removable with respect to the body 16. For this purpose, the body provides a depending wall 25 which telescopes with a projection 26 of the cutter 22, one or more screws 27 acting to retain the cutter in place. A circular plate 28 is clamped in place between the projection 26 of the cutter and an annular wall 29 provided by the body 16. Below this plate, the structure provides a space for receiving a sprinkler head, and the plate separates this space from a gear chamber 30 and thus prevents entry of dirt or other foreign matter into this gear chamber.

The body 16 is usually formed to present a cylindrical exterior surface and the mowing unit 17 preferably extends outward from one side thereof. This mowing unit includes stationary and movable shearing means, shown as comprising a stationary blade 33 providing a shearing edge 34 and a desired number of movable blades 35, each providing shearing edges 36 disposed to shear across the edge 34 of the stationary blade 33. The blades 33 and 35 should preferably extend inward close to the surface of the body 16 to mow a zone immediately adjacent. The number of blades 35 can be varied from that shown without departing from the spirit of the invention, and should be sufficient so that the mowing unit will not leave ridges when it is turned through its annular locus of motion around the sprinkler head.

Preferably, the blades 35 extend substantially helically with respect to a shaft 38 to which they are connected, as by brackets 39. In addition, the rotor formed by these elements is not of uniform size throughout its length but preferably tapers inward toward the shaft 38 toward the outer end thereof. The blade 33 is then disposed at an angle inclined with respect to the horizontal so that the grass-shearing action takes place on a slight incline. The blade 33 may be inclined only a few degrees from the horizontal, an inclination of from 5° to 10° being found very desirable. On the other hand, it is within the contemplation of the invention that the blade 33 may be horizontal and the rotor not tapered if the annular zone to be mowed is to be flat rather than frusto-conical.

The shaft 38 of the mowing unit is preferably pivoted both in the body 16 and in a position spaced therefrom. Serving the latter purpose are upper and lower arms 40 and 41 providing bent and mutually-overlapping portions 40' and 41' held together as by rivets 42. These portions 40' and 41' may be drilled to journal the shaft 38 or suitable anti-friction bearings can be used at this point to journal the shaft. The upper arm 40 is preferably connected to the body 16. As shown in Figure 1, this can be accomplished by bending the arm 40 out of its normal plane to form a tab 44 shaped to conform to the periphery of the body 16 and secured thereto, as by screws 45. The lower arm 41 may be similarly or otherwise secured to the body 16 and the blade 33 is preferably removably attached thereto by any suitable means.

The shaft 38 is shown as being journalled in horizontally-aligned openings 46 and 47 of the body 16, though suitable anti-friction bearings can be incorporated at this point, if desired. A collar 48 within the gear chamber 30 serves to prevent outward movement of the shaft 38 and inward movement of this shaft toward the body is prevented by a collar 49, these collars resting adjacent opposite side walls of the gear chamber 30.

Gear means is provided within the gear chamber 30 for turning the shaft 38 and the blades 35 with respect to the blade 33. This gear means preferably includes a beveled gear 50, which may well be formed integrally with the collar 49, and a beveled gear 51. The gear 51 is rigidly connected to a vertical drive shaft 52 journalled in and extending through an opening 53 of the body, this shaft being of such length as to extend upward to the control mechanism 18 to be hereinafter described. Turning of the shaft 52 will thus turn the blades 35 of the mowing unit.

In the preferred embodiment of the invention, mechanism is provided for revolving the mowing unit 17 bodily around a vertical axis coaxial with the engagement means 20 and substantially coaxial with respect to the sprinkler head 10. In the embodiment shown in Figure 1, this is accomplished by the same turning of the shaft 52 as is used to drive the blades 35. While various gear systems can be used in this connection, Figure 1 shows an embodiment which has been found particularly effective and extremely simple.

In this connection, the entire body 16 is made rotatable with respect to a stationary member 54. This is accomplished by enlarging the upper end of the body 16 to form an upright flange 55 which telescopes with a depending flange 56 of a plate 57 forming the main part of the stationary member 54. The inner diameter of the depending flange 56 is only slightly larger than the external diameter of the upright flange 55 so as to obtain a desirable journalling effect. To prevent the plate 57 and its flange 56 from being lifted from the body 16, I provide an annular ring 58 secured by screws 59 to the lower edge of the flange 56 and extending inward just below the upright flange 55. Correspondingly, the body 16 is rotatably mounted with respect to the stationary member 54 and the plate 57 and is prevented from axial movement with respect thereto by being rotatable between the plate and the attached ring 58.

The body 16 and the plate 57 cooperate in defining a gear chamber 60 through which the shaft 52 extends. Rigidly connected to this shaft in the gear chamber is a small pinion 62 meshing with an idler pinion 63 rotatably mounted on a pin 64, threaded or otherwise secured to the plate 57. This pin 64 provides a head 65 fitting into a corresponding cavity of the pinion 63 so that this pinion is normally removable as a unit with the plate 57. The pinion 63 meshes with an internally-toothed ring gear 66, as best shown in Figures 1 and 2, this ring gear being suitably secured to the body 16 within the gear chamber 60, as by one or more screws 67.

The plate 57 is normally stationary during operation of this embodiment of the invention. Rotation of the shaft 52 with respect to this plate will thus turn the pinion 62 and transmit force through the idler pinion 63 to the ring gear 66 to turn same about the axis of the shaft 52. As this ring gear is connected to the body 16, it follows that the body and its attached mowing unit 17 will move about the axis of the shaft 52. The rate of turning of the body will be considerably less than the rate of turning of the shaft 38 as the gear ratio of the gear system comprising gears 62, 63, and 66 is considerably less than the gear ratio of the gear means including the beveled gears 50 and 51. The rate of turning of the body is so correlated with respect to the rate of turning of the blades 35 that the mowing unit will cut smoothly through an annular zone without leaving ridges.

To retain the plate 57 stationary and to interconnect the mowing device 15 and the control mechanism 18, I provide an upright member shown as comprising a tube 70 which may be welded or otherwise secured to the top of the plate 57 and through which the shaft 52 extends. To the upper end of this tube 70 is rigidly connected a lower portion 71 of a handle 72. This lower portion 71 provides vertically-aligned openings 73 and 74 for journalling the upper end of the shaft 52, and a beveled gear 75 is positioned therebetween and rigidly connected to the shaft 52. This beveled gear 75 is disposed in a socket of the lower portion 71 so as to extend outward from the socket to mesh with a larger beveled gear 77 fixed rigidly to a crank 78. The beveled gear 77 and crank 78 are suitably journalled on a shaft 79 mounted in an opening 80. It will be apparent that the handle 72 serves to retain stationary the plate 57 and at the same time to raise and lower the mowing device 15.

The invention thus far described is operated as follows. The operator places the engagement means 20 around a sprinkler head 10 and lowers it so that the annular cutting edge 24 shears the grass growing over the top of this sprinkler head. The handle 72 is then held in a fixed position or raised very slightly, permitting the engagement means 20 to be rotatable either by contact with the sprinkler head or by being positioned in the annular groove previously cut by the lowering of the annular cutting edge 24. At this time, the operator turns the crank 78, thus rotating the shaft 52 with respect to the tube 70. As previously described, the blades 35 will turn relatively fast and the body 16 will revolve relatively slowly about the vertical axis of the engagement means. The result will be that an annular zone is mowed around the sprinkler head. It is usually sufficient to turn the crank 78 until the mowing unit 17 has made one complete revolution, but this operation can be repeated. For example, it is possible to center the engagement means 20 with respect to the sprinkler head and slowly lower the entire unit while turning the crank 78 so that the mowing unit 17 moves around the head a plurality of times, each time taking a deeper cut. It is possible to mow annular zones of varying width by controlling the vertical position of the mowing device 15. If the device is lowered only sufficiently so that an inner portion of the blade 33 is effective in mowing, it will be apparent that the width of the annular zone will be less than if the mowing device 15 is lowered so that the complete length of the blade 33 is effective in the cutting operation. Should it be desired in exceptional instances to trim an annular zone which is of greater width on one side than on the other, it is only necessary for the operator to hold the unit in such a position that the tube 70 is slightly inclined from its normal vertical position.

If the operator desires that the mowing unit 17 should not revolve around the vertical axis of the engagement means 20 when the crank 78 is turned, the device can be modified so that this turning of the mowing unit will take place only when the handle 72 is turned through a corresponding angle. In other words, the mowing unit can be made non-revolvable with respect to the sprinkler head by rigidly connecting the tube 70 to the body 16. In the embodiment shown in Figure 1, this can be accomplished by removing the plate 57 and detaching the idler gear 63 and the pin 64. Thereafter, the device can be reassembled and a bolt can be threaded downward into the opening previously receiving the pin 64, the bolt being of such length as to traverse the gear chamber 60 and extend into a depression 82 of the body 16, thus locking the plate 57 to the body and, correspondingly, preventing rotation between the tube 70 and this body.

A simplified embodiment of the invention eliminating the gears 62, 63, and 66 is shown in Figure 3. The control mechanism 18 can be identical with that shown in Figure 1 but, in this embodiment, the body 16' does not provide a gear chamber and no separate plate, such as the plate 57, is used. Instead, the lower end of the tube 70 is welded or otherwise secured directly to the top of the body 16'. The gear connections to the mowing unit 17 and the construction of this mowing unit will be as shown in Figure 1. In this embodiment, the means for rotating the mowing unit about the vertical axis of the engagement means 20 or the sprinkler head 10 will be the handle 72, and the operator can walk around the sprinkler head to revolve the mowing unit completely therearound.

Various changes and modifications can be made without departing from the spirit of the invention as defined in the appended claims.

I claim as my invention:

1. In a device for mowing grass in an annular zone, the combination of: an upright member providing a longitudinal axis; a body providing a ground-engageable centering means; means for connecting said body to the lower end of said upright member to dispose said centering means substantially coaxial with respect to said longitudinal axis; a stationary blade; means for mounting said stationary blade to extend sidewise from said body at an acute angle with respect to said longitudinal axis; a rotary blade means; means for mounting said rotary blade means to turn about an axis above said stationary blade in shearing relationship therewith; and means for rotating said rotary blade means relative to said stationary blade.

2. In a mowing device, the combination of: a body providing a gear chamber; an annular engagement means extending downward from said body and providing a space for the reception of a sprinkler head; a wall separating said space and said gear chamber; a shaft journalled in said body and extending outward therefrom; one or more blades secured to said shaft outside said body; a stationary blade extending outward from said body below said shaft and across which said one or more blades move in shearing relationship; a drive shaft extending from a position within said gear chamber to a position above said body; and gear means in said gear chamber for operatively connecting said drive shaft and said outward-extending shaft.

3. In a device for mowing grass in an annular zone, the combination of: a body including a ground-anchoring engagement means forming a pivot means about which said body can turn; a mowing unit mounted on said body to extend sidewise therefrom, said mowing unit including movable and stationary shearing means; and means for moving said movable shearing means across said stationary shearing means.

4. In combination in a device for mowing grass in an annular zone around a sprinkler head: a body; an annular engagement means depending from said body and providing a space of sufficient size to receive said sprinkler head, said annular engagement means providing an external surface; a cutting blade extending outward from a position contiguous to said external surface to a position spaced from said surface; a rotatable shearing means above said blade in shearing relationship therewith, said rotatable shearing means extending outward along said cutting blade from a position immediately adjacent said external surface; and means for rotating said shearing means with respect to said blade.

5. In a device for mowing grass in an annular zone, the combination of: a body providing a vertical axis; a mowing unit mounted on said body to extend sidewise therefrom and including movable and stationary shearing means; a drive shaft; gear means operatively connecting said drive shaft to said movable shearing means to move same across said stationary shearing means; and gear means operatively connecting said drive shaft and said body to turn said body and revolve said mowing unit around said axis of said body to mow said annular zone.

6. A combination as defined in claim 5, in which said drive shaft extends vertically from said body and including means above said body for turning said drive shaft.

7. In a mowing device, the combination of: a stationary member providing a vertical axis; a body; means for rotatably attaching said body to said stationary member to turn about said vertical axis; a mowing unit attached to and extending sidewise from said body and including movable and stationary shearing means, said movable shearing means including a shaft and one or more blades secured thereto, said body including means for journalling said shaft; a vertically-disposed drive shaft; gear means for operatively connecting said shaft of said movable shearing means and said drive shaft; and a second gear means operatively connecting said drive shaft and said body to turn said body about said vertical axis and thus revolve said mowing unit about said axis.

8. A combination as defined in claim 7, in which said second gear means includes a pinion on said drive shaft, an idler gear meshing therewith, means attached to said stationary member for journalling said idler gear, and a ring gear secured to said body and meshing with said idler gear.

9. In a mowing device, the combination of: a body; means for mounting said body for rotation about a vertical axis; a shaft journalled in said body and extending outward from one side thereof; a stationary blade extending outward from said body below said shaft and forming a part of a mowing unit; one or more movable blades carried by said shaft in a position to shear across said stationary blade and forming a part of said mowing unit; an arm means extending outward from said body at a position above said stationary blade and providing an end portion extending toward said shaft; means for journalling the outer end of said shaft with respect to said end portion; means for turning said shaft; and means for rotating said body about said axis to revolve said mowing unit around said axis.

10. A combination as defined in claim 9, including means for detachably connecting said arm to said body.

11. A combination as defined in claim 9, in which said means for turning said shaft includes a drive shaft extending upward from said body, a crank disposed above said body, and a gear means operatively connecting said crank to said drive shaft.

12. A combination as defined in claim 9, in which said means for rotating said body about said axis includes a tube secured to said body and a handle at the upper end of said tube, and in which said means for driving said shaft includes a drive shaft extending upward from said body inside said tube, a rotatable crank adjacent said handle, and gear means connecting said rotatable crank to said drive shaft.

13. In a device for mowing grass in an annular zone, the combination of: a grass-mowing unit including rotatable and stationary shearing means; ground-engageable pivot means exclusively at one end of said mowing unit for anchoring said mowing unit to turn about a vertical axis determined by said pivot means; an upright member extending upward from said pivot means; crank means near the upper end of said upright member; and means for operatively connecting said crank means and said rotatable shearing means to rotate the latter with respect to said stationary shearing means.

14. A combination as defined in claim 1, in which said rotary blade means includes a plurality of blades disposed about said axis which is above said stationary blade, said plurality of blades providing shearing edges lying in a frusto-conical section generated about said axis, and in which this axis is substantially perpendicular to said longitudinal axis.

15. A combination as defined in claim 3, in which said ground-anchoring engagement means comprises an annular member depending from said body to a position below the lowermost portion of said shearing means, and in which said annular member provides a space opening downward and of such size as to receive a sprinkler head.

16. In a mowing device, the combination of: a stationary member providing an axis; a body; means for rotatably attaching said body to said stationary member to turn about said axis; a mowing unit attached to said body and extending sidewise therefrom, said mowing unit including movable and stationary shearing means; a drive means; and means for simultaneously moving said movable shearing means in shearing relationship with respect to said stationary shearing means and for revolving said mowing unit about said axis, said means including means operatively connecting said drive means to said movable shearing means and means operatively connecting said drive means to said body to revolve same about said axis.

17. In a mowing device, the combination of: a stationary member providing a vertical axis; a body; means for rotatably attaching said body to said stationary member to turn about said vertical axis; a mowing unit attached to said body and extending sidewise therefrom and including movable and stationary shearing means; and drive means for simultaneously moving said movable shearing means in shearing relationship with respect to said stationary shearing means and for revolving said mowing unit about said vertical axis, said drive means including a drive shaft, gear means operatively connecting said drive shaft to said body, and gear means operatively connecting said drive shaft to said movable shearing means.

18. A combination as defined in claim 3, including a tube extending upward from said body and a handle connected to the top of said tube, and in which said means for moving said movable shearing means across said stationary shearing means includes a drive shaft within said tube and means for operatively connecting said drive shaft to said movable shearing means.

19. A combination as defined in claim 3, including a shaft journalled in said body and extending outward from one side thereof, said movable shearing means including one or more movable blades carried by said shaft, a lower arm means secured to said body and extending outward below said shaft and providing end means extending upward to journal the end of said shaft, said arm means carrying said stationary shearing means.

20. A combination as defined in claim 3, in which said stationary shearing means includes a fixed blade, and in which said movable shearing means includes a shaft journalled in said body and a plurality of blades connected thereto to move across said fixed blade in shearing relationship, and including means for turning said body about said pivot means.

WILLIAM J. ROWAN.